United States Patent [19]

Yamamoto

[11] Patent Number: 5,036,958
[45] Date of Patent: Aug. 6, 1991

[54] AUTOMATIC SLACK ADJUSTER FOR VEHICLE BRAKES

[75] Inventor: Mayjue A. Yamamoto, Livonia, Mich.

[73] Assignee: Krestbuch Engineering, Inc., East Lansing, Mich.

[21] Appl. No.: 399,574

[22] Filed: Aug. 28, 1989

[51] Int. Cl.[5] .................. F16D 51/00; F16D 65/38
[52] U.S. Cl. ........................ 188/79.55; 188/196 BA
[58] Field of Search ............ 188/79.55, 72.9, 196 BA, 188/196 D, 79.51, 196 V; 74/425

[56] References Cited

U.S. PATENT DOCUMENTS

| | | |
|---|---|---|
| 1,525,568 | 2/1925 | Chapin . |
| 1,689,235 | 9/1928 | Fowler et al. . |
| 2,109,637 | 3/1938 | Gutkaiss .................. 188/79.55 X |
| 2,551,888 | 5/1951 | Learn ..................... 188/79.5 |
| 3,121,478 | 2/1964 | Bostwick ................. 188/79.5 |
| 3,174,353 | 3/1965 | Gross ..................... 74/425 X |
| 3,307,661 | 3/1967 | Bostwick ................. 188/196 |
| 3,371,755 | 3/1968 | Leeper ................... 188/196 BA |
| 3,465,603 | 9/1969 | Lindstrom ............... 74/89.14 |
| 3,921,765 | 11/1975 | Swander, Jr. ............ 188/79.5 K |
| 4,150,735 | 4/1979 | Acre et al. ............. 188/79.55 X |
| 4,343,561 | 8/1982 | Campanini ............... 403/97 |

Primary Examiner—Robert J. Oberleitner
Attorney, Agent, or Firm—Brooks & Kushman

[57] ABSTRACT

An automatic slack adjuster has an adjustment mechanism which includes a ratchet wheel having ratchet teeth and being rotatably mounted to a lower portion of a pivotal arm of the adjuster and drivingly coupled to a set of gears for causing brake shoe and drum clearance adjusting rotation of the gears upon rotation of the ratchet wheel. The mechanism also includes an adjusting assembly having ratchet teeth complementary to the ratchet teeth of the ratchet wheel and a pair of links pivotally mounting the adjusting assembly to the arm and a push rod pivotally connected to the arm to define a pivotal parallelogram linkage disposing the adjusting assembly with its ratchet teeth in a one-way driving relation with the ratchet teeth of the ratchet wheel. The parallelogram linkage permits reciprocable movement of the adjusting assembly along the arm as the arm undergoes pivotal movement upon extension and retraction of the push rod for rotatably driving the ratchet wheel to cause the clearance adjusting rotation of the gears upon movement of the arm and thereby the push rod through an over-normal brake applying stroke.

23 Claims, 6 Drawing Sheets

AUTOMATIC SLACK ADJUSTER FOR VEHICLE BRAKES

BACKGROUND OF THE INVENTION

1. Field of the Invention

The present invention generally relates to slack adjusters for vehicle brakes and, more particularly, to an improved automatic slack adjuster for an air brake system of the type commonly used on heavy trucks and construction machines 2. Description of the Prior Art Heavy vehicles, such as trucks, are typically provided with an air brake system. An air brake system generally includes an air chamber to which air is supplied during braking, an S-cam mounted to one end of a rotatable shaft and coupled to brake shoes for causing expansion thereof against a brake drum upon rotation of the cam shaft in a given direction, a slack adjuster mounted to the other end of the cam shaft, and a push rod extending from the air chamber and pivotally connected to the slack adjuster for causing pivoting thereof and rotation of the cam shaft upon extension of the push rod by supply of compressed air to the air chamber.

Thus, when the pedal of the brake system is applied for braking, compressed air is supplied to the chamber causing extension of the push rod from the chamber through a working stroke against the bias of a return spring. Extension of the push rod results in pivoting of the slack adjuster to an applied position and rotating of the S-cam which, in turn, expands the brake shoes into contact with the brake drum. Then, when the brake pedal is released, compressed air is vented from the chamber permitting retraction of the push rod into the air chamber through a return stroke due to the force of the return spring. Retracting of the push rod results in reverse pivoting of the slack adjuster back to its released position and reverse rotating of the S-cam which, in turn, retracts the brake shoes clear of the brake drum. In such manner, one brake apply and release cycle is completed.

Ideally, a minimum clearance is provided between the brake shoes and the brake drum when the brake is released. But as brake linings wear over time or the brake drum expands due to heat, the clearance between the brake shoes and the brake drum increases. As a result, the air chamber push rod has to be extended or pushed further to pivot the slack adjuster and rotate the cam shaft to compensate for the increased clearance. However, the air chamber push rod travel is inherently limited. Therefore, adjustment of the slack adjuster is required to compensate for the increased clearance.

The required adjustment of the slack adjuster is commonly done by manually rotating a worm and worm gear in the slack adjuster. Rotation of the worm gear, in turn, rotates the cam shaft and advances the S-cam contact point to restore the proper running clearance between the brake shoes and the brake drum. However, manual adjustment is generally undesirable since relatively frequent adjustment is required as brake linings become worn.

Automatic slack adjusters for vehicle brakes are known in the prior art. Various techniques are provided in the prior art slack adjusters for rotating the worm gear in response to increase in the push rod working stroke to automatically change the angular position between the slack adjuster and the cam shaft for eliminating slack due to wear of brake linings. (Automatic slack adjusters should not adjust to take-up slack due only to thermal expansion because the brakes could lock-up when cooled-down.) However, problems have occurred with prior art automatic slack adjusters due to poor reliability, excessive weight, complicated and expensive construction and in providing a design which accurately distinguishes needed adjustment for brake lining wear from unwanted adjustment for thermal expansion to establish a desired clearance between the brake shoes and the brake drum when the brake is released. Thus, improvement is still needed in the design of an automatic slack adjuster.

SUMMARY OF THE INVENTION

The present invention provides an automatic slack adjuster which is an improvement over prior art designs and satisfies the aforementioned need. The automatic slack adjuster has an elongated pivotal arm pivotally connected to a push rod of a vehicle air brake system for pivotal movement of the pivotal arm upon extension and retraction of the push rod and a set of intermeshing gears mounted to the pivotal arm for connecting the pivotal arm to a cam shaft of the vehicle brake system for causing rotation of the cam shaft upon pivotal movement of the pivotal arm. The set of gears are operable for adjustably, pivotally moving the pivotal arm relative to the cam shaft upon rotation of the gears relative to one another to change the angular position of the pivotal arm relative to the cam shaft for changing the clearance between brake shoes and a brake drum of the brake system.

In accordance with the present invention, the automatic slack adjuster has an adjustment mechanism which comprises: (a) a motion transmitting member having a first set of drive elements thereon and being movably mounted to the pivotal arm and drivingly coupled to the set of gears for causing clearance adjusting rotation of the gears upon movement of the motion transmitting member; (b) an adjusting assembly having a second set of drive elements thereon complementary to the first set of drive elements of the motion transmitting member; and (c) means for pivotally mounting the adjusting assembly to the push rod and the pivotal arm so as to define a pivotal parallelogram linkage disposing the adjusting assembly with its second set of drive elements in a one-way driving relation with the first set of drive elements of the motion transmitting member and permitting generally reciprocable movement of the adjusting assembly along the pivotal arm as the pivotal arm undergoes pivotal movement upon extension and retraction of the push rod for movably driving the motion transmitting member to cause the clearance adjusting rotation of the gears upon movement of the pivotal arm and thereby the push rod through an over-normal brake applying stroke.

More particularly, the adjusting assembly includes upper and lower elongated members. The lower member has the second set of drive elements thereon. The upper member is part of the pivotal parallelogram linkage. Further, the means for pivotally mounting the adjusting assembly includes a pair of link elements. Also, the adjusting assembly includes a coupler interconnecting the upper and lower members for sliding movement relative to one another and defining a first limit to the movement of the upper and lower members away from one another. The adjusting assembly further includes a stop element adjustably mounted on the coupler for presetting a second opposite limit to the movement of the upper and lower members toward one another for defining a point separating a normal working stroke of the pivotal arm and thereby the push rod wherein pivoting of the pivotal arm and therewith motion of the adjusting assembly does not drive the motion transmitting member and the over-normal working stroke of the pivotal arm and thereby the push rod wherein pivoting of the pivotal arm and therewith motion of the adjusting assembly does drive the motion transmitting member for causing clearance adjusting rotation of the gears.

Furthermore, the pivotal arm and the upper member of the adjusting assembly have aligned rows of spaced holes for defining different lengths of the pivotal arm and the pivotal parallelogram linkage to accommodate different working stroke lengths of the push rod and displacements of the adjusting assembly. Also, a gear reduction unit is mounted to the pivotal arm and drivingly coupling the motion transmitting member to the set of gears.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several figures. Also in the following description, it is to be understood that such terms as "front" and "rear", "upper" and "lower", "right" and "left", and the like, are words of convenience and are not to be construed as limiting terms.

Prior Art Slack Adjuster

Figure 1:
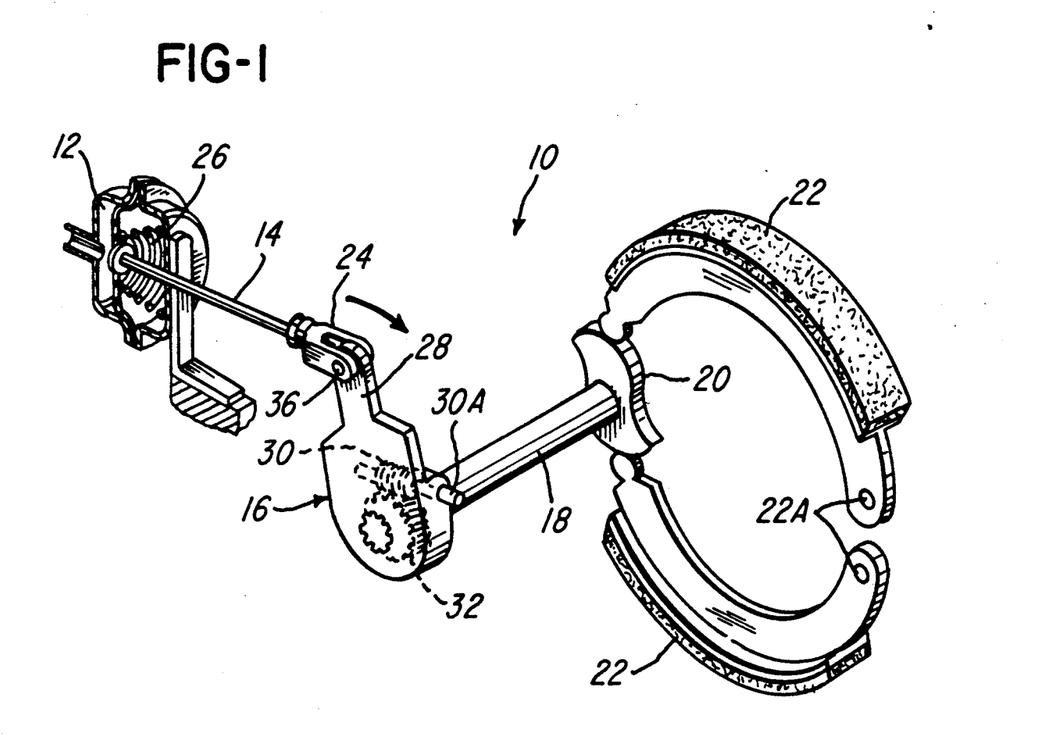
FIG. 1 is a schematic view of a prior art air brake system incorporating a manual slack adjuster.

Referring now to the drawings, and particularly to FIG. 1, there is schematically illustrated a prior art air brake system, generally designated 10, having the construction typically employed by heavy vehicles. In its basic components, air brake system 10 includes an air chamber 12, a reciprocable push rod 14, a pivotal slack adjuster 16, a rotatable cam shaft 18, a rotatable S-cam 20, and pivotal brake shoes 22.

By depressing or pumping a pedal (not shown) compressed air is supplied to air chamber 12 for braking the vehicle. Slack adjuster 16 is mounted, such as by a spline connection, to one end of rotatable cam shaft 18. Push rod 14 extends from air chamber 12 and is pivotally connected by a yoke or clevis 24 and a pivot pin 36 to the upper end of slack adjuster 16. Upon extension of push rod 14 by supply of compressed air to air chamber 12, push rod 14 causes pivoting of slack adjuster 16 and thereby rotating of cam shaft 18. S-cam 20 is mounted to the opposite end of cam shaft 18 and is coupled to brake shoes 22 for causing pivoting thereof about pivot points 22A and thereby expansion against a brake drum (not shown) upon rotation of cam shaft 18 in a clockwise direction. Reverse rotation of cam shaft 18 in a counterclockwise direction permits brake shoes 22 to contract away from the brake drum (not shown).

Thus, when the pedal (not shown) of air brake system 10 is applied for braking, compressed air is supplied to air chamber 12 causing extension of push rod 14 from air chamber 12 through a working stroke against the bias of a return spring 26 in air chamber 12. Extension of push rod 14 results in pivoting of slack adjuster 16 in the direction of the arrow to an applied position and clockwise rotation of S-cam 20 which, in turn, expands brake shoes 22 into contact with the brake drum (not shown) surrounding brake shoes 22. Then, when the brake pedal (not shown) is released, compressed air is vented from air chamber 12 permitting retraction of push rod 14 into air chamber 12 through a return stroke due to the force of return spring 26. Retracting of push rod 14 results in reverse pivoting of slack adjuster 16 back to its released position and reverse or counterclockwise rotation of S-cam 20 which, in turn, permits contraction of brake shoes 22 clear of the brake drum (not shown). In such manner, one brake apply and release cycle is completed.

Brake shoe lining wear over time and/or brake drum expansion due to heat increases the running clearance originally set between brake shoes 22 and the brake drum (not shown). As a result, push rod 14 has to be extended or pushed further to pivot slack adjuster 16 and rotate cam shaft 18 to compensate for the increased clearance. To decrease the working stroke of push rod 14 back toward its original length, slack adjuster 16 can be manually adjusted.

Slack adjuster 16 has an elongated pivotal arm 28, a worm shaft 30, and a worm gear 32. Worm shaft 30 and worm gear 32 have the same general construction as the corresponding components shown in FIG. 2. Worm shaft 30 is rotatably mounted in slack adjuster 16 and intermeshes with worm gear 32 which, in turn, is splined to the end of cam shaft 18. By turning an end 30A of worm shaft 30 projecting from pivotal arm 28, worm gear 32 can be turned and cam shaft 18 and S-cam 20 rotated relative to slack adjuster 16 to restore brake shoes 22 to the desired running clearance with the brake drum (not shown) and thereby reduce the working stroke of push rod 14 back to its original length.

Automatic Slack Adjuster of Present Invention

Figures 2, 3:
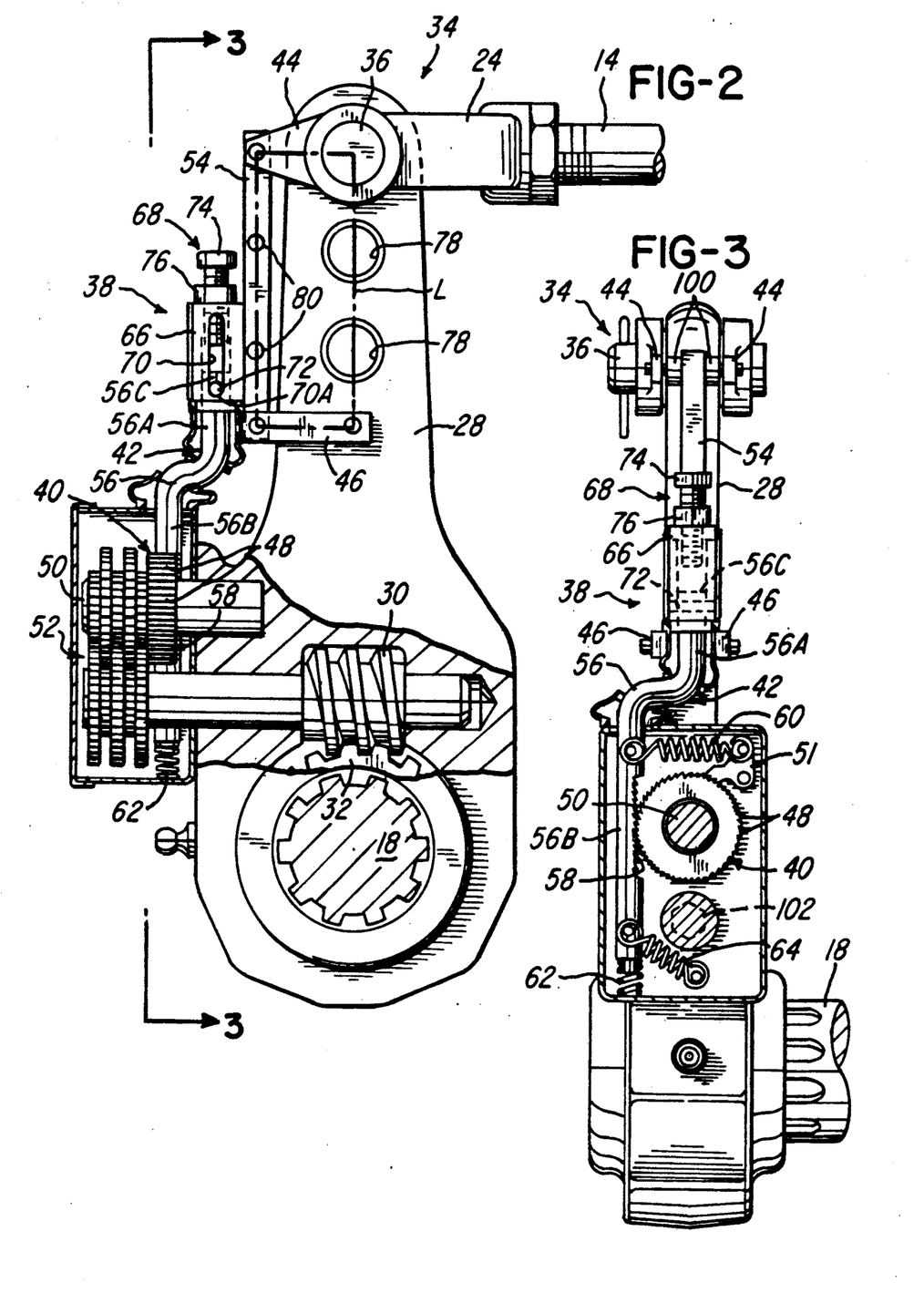
FIG. 2 is a side elevational view of a preferred embodiment of an automatic slack adjuster in accordance with the present invention.
FIG. 3 is an end elevational view of the slack adjuster of FIG. 2 as seen along line 3—3.

Referring to FIGS. 2 and 3, there is illustrated a preferred embodiment of an automatic slack adjuster, generally designated 34 and constructed in accordance with the principles of the present invention. Automatic slack adjuster 34 is operable for automatically restoring the desired running clearance between brake shoes and brake drums and has several components in common with prior art slack adjuster 10, for example, clevis 24, pivotal arm 28, worm shaft 30, worm gear 32 and pivot pin 36. Thus, these same components in automatic slack adjuster 34 are identified by the same reference numerals.

Pivotal arm 28 of slack adjuster 34 is pivotally connected at its upper portion by clevis 24 and pivot pin 36 to the end of push rod 14 of vehicle air brake system 10 which now employs automatic slack adjuster 34 instead of prior art slack adjuster 16. Pivotal arm 28 will pivotally move upon extension and retraction of push rod 14 as the brake is respectively applied and released. Intermeshing gears in the form of worm shaft 30 and worm gear 32 are mounted to a lower portion of pivotal arm 28. Worm shaft 30 and worm gear 32 connect pivotal arm 28 to cam shaft 18 of vehicle brake system 10 for causing rotation of cam shaft 18 upon pivotal movement of pivotal arm 28.

In accordance with the principles of the present invention, automatic slack adjuster 34 includes an adjustment mechanism, generally designated 38. Adjustment mechanism 38 operates in conjunction with worm shaft 30 and worm gear 32 for effecting adjustable pivotal movement of pivotal arm 28 relative to cam shaft 18. In particular, in response to over-travel of push rod 14 and thereby pivotal arm 28, adjustment mechanism 38 causes rotation of worm shaft 30 and worm gear 32 relative to one another to change the angular position of pivotal arm 28 relative to cam shaft 18 and thereby change the clearance between brake shoes 22 and the brake drum (not shown) of brake system 10.

In its basic components, adjustment mechanism 38 includes a motion transmitting member 40, an adjusting assembly 42, and a pair of link elements 44, 46. Motion transmitting member 40 of adjustment mechanism 38 is in the form of a ratchet wheel 40 having a set or row of peripheral ratchet teeth 48 and a shaft 50 which is pressed into the lower portion of pivotal arm 28. A pawl 51 pivotally mounted to pivotal arm 28 adjacent to ratchet wheel 40 engages ratchet teeth 48 so as to only allow rotation of ratchet wheel 40 in one direction, such as counterclockwise as shown in FIGS. 3 and 5C. Preferably, a multi-gear reduction unit 52 is mounted to ratchet wheel shaft 50 and one end of worm shaft 30 for drivingly coupling ratchet wheel 40 to worm shaft 30 and thereby to worm gear 32. Reduction of the amount of rotation by multi-gear reduction unit 52 and worm shaft 30 and worm gear 32 combination increases the rotational force for easily overcoming frictional forces and return spring force in the brake, A hexagonal opening 102 provides a means for servicing multi-gear reduction unit 52.

Adjusting assembly 42 of adjustment mechanism 38 includes upper and lower elongated members 54, 56. Lower elongated member 56 is composed of axially offset upper and lower portions 56A, 56B with a second set or rack of ratchet teeth 58 defined on its lower portion 56B which are complemetary in configuration to the first set of ratchet teeth 48 of ratchet wheel 40. A plurality of springs 60, 62, 64 respectively support the bottom end of lower elongated member 56 and interconnect lower elongated member 56 and pivotal arm 28 for biasing lower portion 56B of lower elongated member 56 toward ratchet wheel 40 while at the same time, by being yieldable, permitting lateral movement of lower elongated member 56 away from ratchet wheel 40 to allow its ratchet teeth 58 to move upwardly past ratchet teeth 48 on ratchet wheel 40.

Adjusting assembly 42 also includes a coupler 66 interconnecting upper and lower elongated members 54, 56 and a stop element 68 mounted on coupler 66. Coupler 66 has a pair of axially extending slots 70 and is hollow for receiving an upper end 56C of upper portion 56A of lower elongated member 56 therein. Coupler 66 also includes a pin 72 which extends transversely through upper end 56C of lower elongated member 56 and slots 70 for permitting sliding movement of lower elongated member 56 relative to coupler 66 but limited to between opposite ends of slots 70. Preferably, as shown in FIGS. 2 and 3, coupler 66 is a hollow sleeve rigidly attached to upper elongated member 54. Stop element 68 is in the form of a cap screw 74 threadable into sleeve 66 and a locking nut 76 threaded on cap screw 74 for securing cap screw 74 in the desired adjusted position.

Thus, lower ends 70A of slots 70 of coupler 66 define a first limit to the movement of upper and lower elongated members 54, 56 away from one another. On the other hand, stop element 68 adjustably mounted on coupler 66 is used to preset a second opposite limit to the movement of upper and lower elongated members 54, 56 toward one another for defining a point which separates what is a preset normal working stroke N of pivotal arm 28 and thereby push rod 14, such as extending from positions A to B in FIGS. 4A–4D, from what is considered an over-normal working stroke O of pivotal arm 28 and thereby push rod 14 such as extending from positions A to C.

Link elements 44, 46 of adjustment mechanism 38 extend substantially parallel to and are spaced from one another along the upper portion of pivotal arm 28. Upper link element 44, which is an extension of clevis 24, is fixed at one end of clevis 24 to push-rod 14 and in conjunction with a pair of spacer rings 100 is pivotally connected at the opposite end to upper elongated member 54 of adjusting assembly 42. The other link element 46 is pivotally connected at one end to pivotal arm 28 and pivotally connected at the opposite end to upper elongated member 54. Together, link elements 44, 46, upper elongated member 54 and pivotal arm 28 define a pivotal parallelogram linkage L, as outlined by the dashed box in FIG. 2. Linkage L so defined disposes lower portion 56B of adjusting assembly lower elongated member 56 with its set of ratchet teeth 58 in a one-way driving relation with the set of ratchet teeth 48 of ratchet wheel 40. Further, the parallelogram linkage L permits generally rectilinear movement of upper and lower elongated members 54, 56 of adjusting assembly 42 upwardly and downwardly along pivotal arm 28 as pivotal arm 28 undergoes pivotal movement upon extension and retraction of push rod 14. In FIG. 2, it should be noted that pivotal arm 28 and upper elongated member 54 of adjusting assembly 42 have aligned rows of spaced holes 78, 80 for defining different lengths of pivotal arm 28 and parallelogram linkage L to accommodate different working stroke lengths of push rod 14 and displacements of adjusting assembly 42.

Turning now to FIGS. 4A-4D, slack adjuster 34 of FIGS. 2 and 3 is illustrated schematically at successive positions in a typical brake apply and release cycle. FIGS. 5A-5D illustrate the successive positions of the components of adjusting assembly 42 of slack adjuster adjustment mechanism 38 of FIGS. 2 and 3 in the brake apply and release cycle corresponding to the positions of adjusting assembly 42 seen in FIGS. 4A-4D.

Figure 4A:
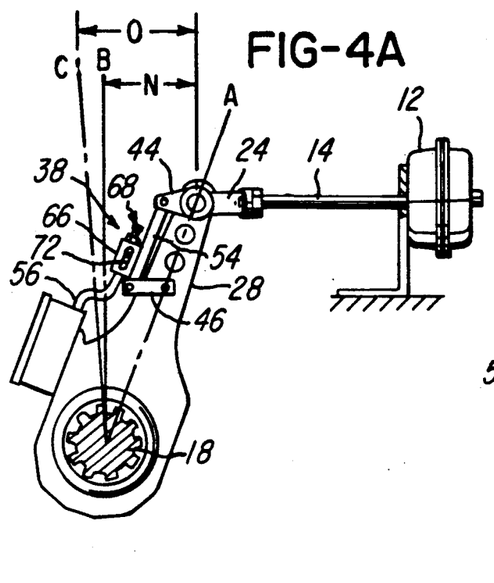
FIG. 4A-4D are a sequence of views showing the slack adjuster of FIG. 2 at successive positions in a brake apply and release cycle.
Figure 5A:
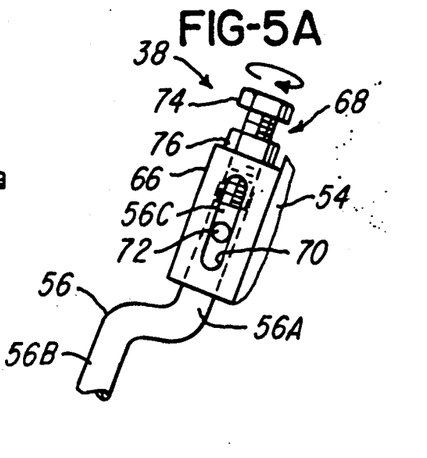

FIGS. 4A and 5A show slack adjuster 34 and adjusting assembly lower elongated member 56, coupler 66 and stop element 68 in an initial released position A in the brake apply and release cycle. To set the upper limit of coupler 66, stop element 68 is adjusted or screwed down to touch upper end 56C of lower elongated member 56 and then it is locked at such position by tightening down locking nut 76.

Figure 4B:
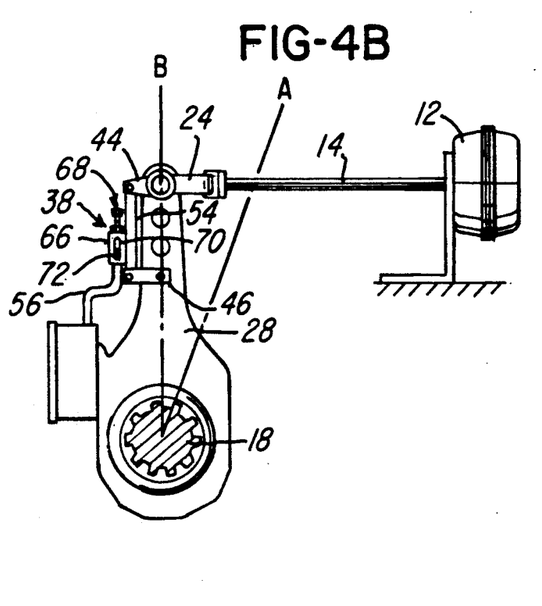
Figure 5B:
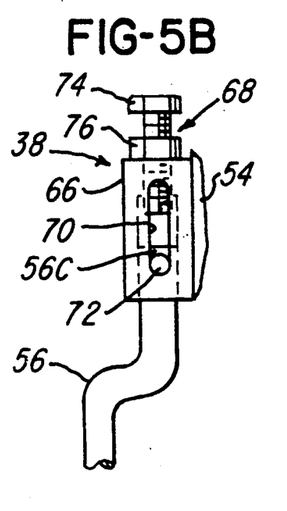
Figure 5C:
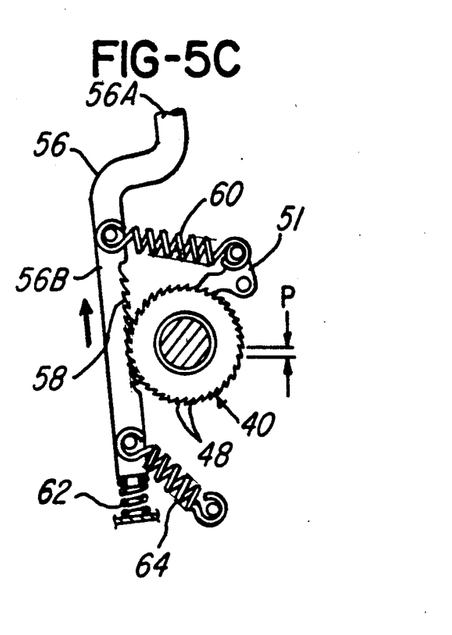
Figures 6, 7:
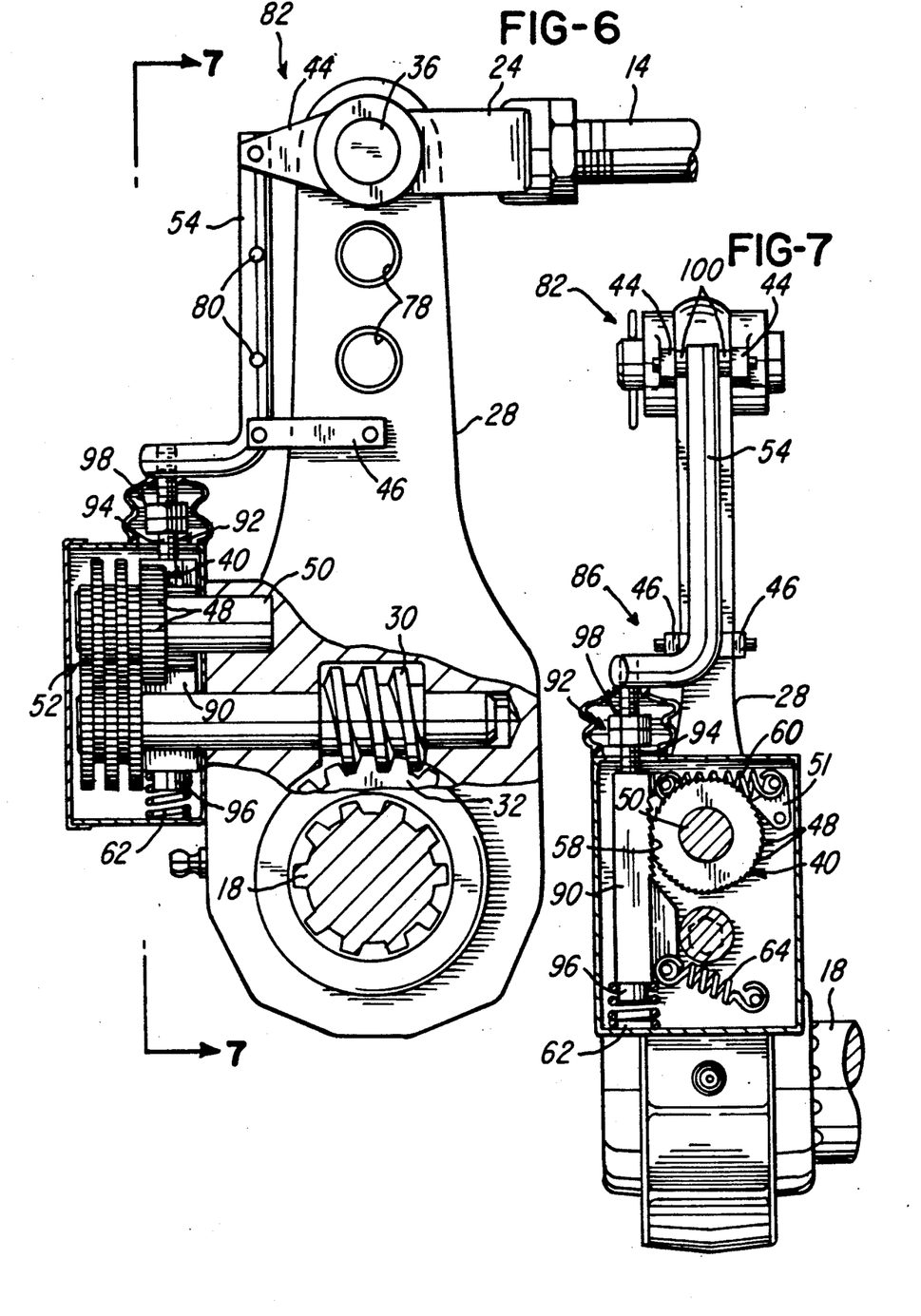
FIG. 6 is a side elevational view of a modified embodiment of an automatic slack adjuster in accordance with the present invention.
FIG. 7 is an end elevational view of the slack adjuster of FIG. 6 as seen along line 7—7.
Figures 8, 9:
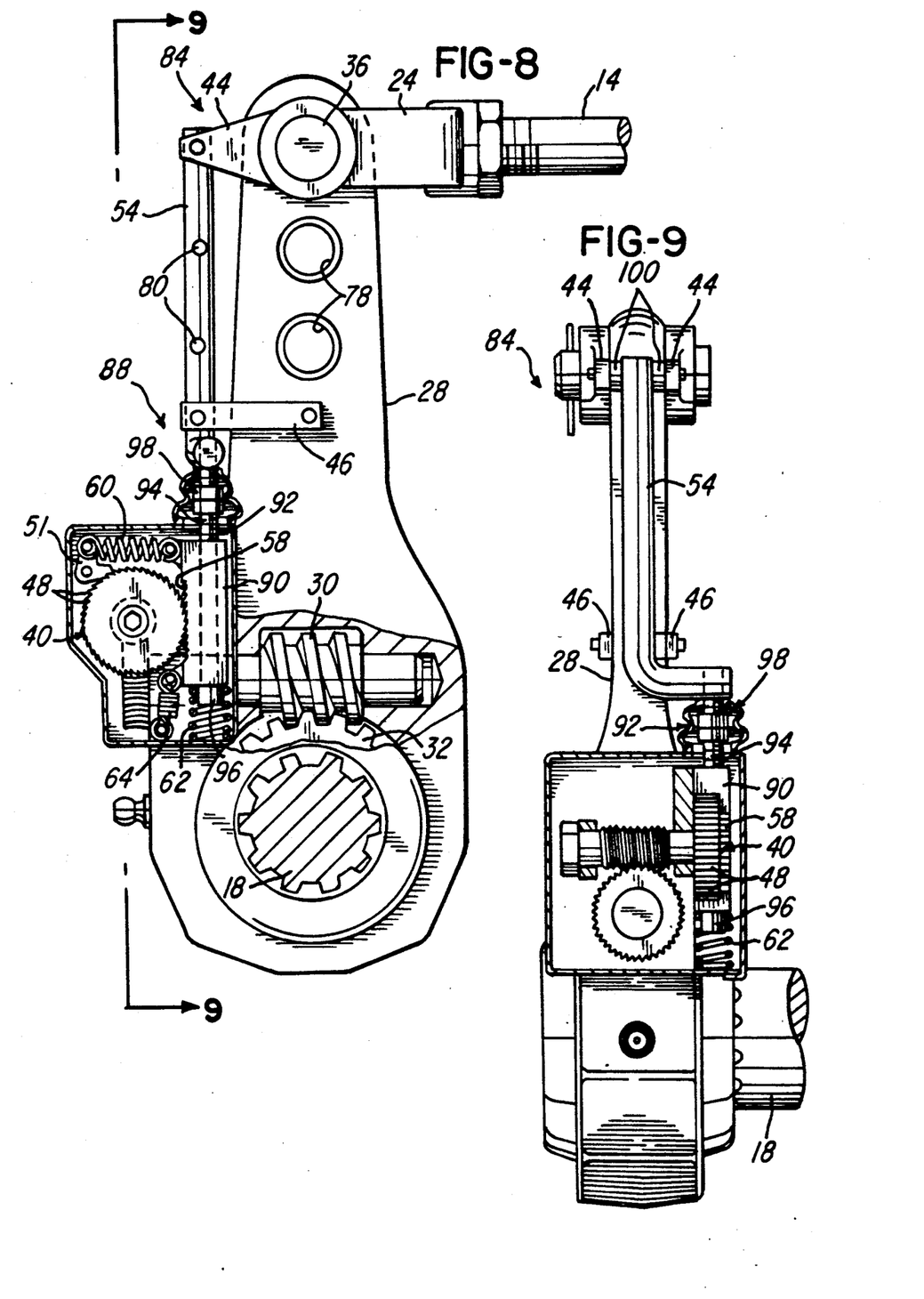
FIG. 8 is a side elevational view of another modified embodiment of an automatic slack adjuster in accordance with the present invention.
FIG. 9 is an end elevational view of the slack adjuster of FIG. 8 as seen along line 9—9.

FIGS. 4B and 5B show that adjusting assembly lower elongated member 56 has not moved at applied position B and the angle between pivotal arm 28 and push rod 14 is approximately 90° for maximum torque. As slack adjuster pivotal arm 28 moves through the normal working stroke N to the applied position B, coupler 66 is pulled upwardly by pivotal parallelogram linkage L. Movement of upper member 56 begins as pin 72 approaches the lower end of, or the limit defined by, slots 70 in coupler 66. Coupler 66 begins to pull upper elongated member 56 upwardly when the lower end of slots 70 reaches pin 72.

Thus, lower elongated member 56 is not yet lifted by coupler 66, or, if it should be lifted, the distance traveled by lower elongated member 56 in the upward direction is less than pitch P, or distance between adjacent pairs, of ratchet teeth 48 of ratchet wheel 40. Thus, movement of lower elongated member 56 is insufficient to index its teeth 58 relative to teeth 48 of ratchet wheel 40 on the following downward movement of lower elongated member 56 occurring concurrently as pivotal arm 28 returns to its released position A (in FIG. 4A). The failure to index lower elongated member 56 means that the desired range of the running clearance between brake shoes 22 and the brake drum is still intact and that the brake shoe lining has not worn sufficiently and/or the brake drum has not expanded enough by heat to increase the clearance past the point where its restoration is required.

Figure 4C:
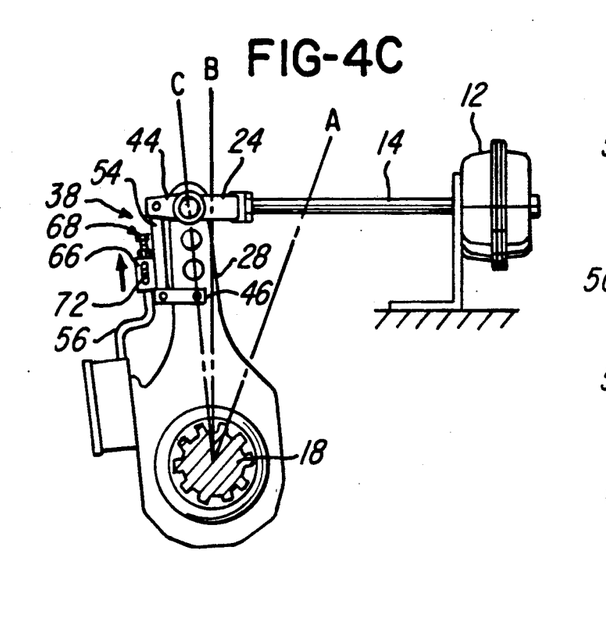
Figures 4D, 5D:
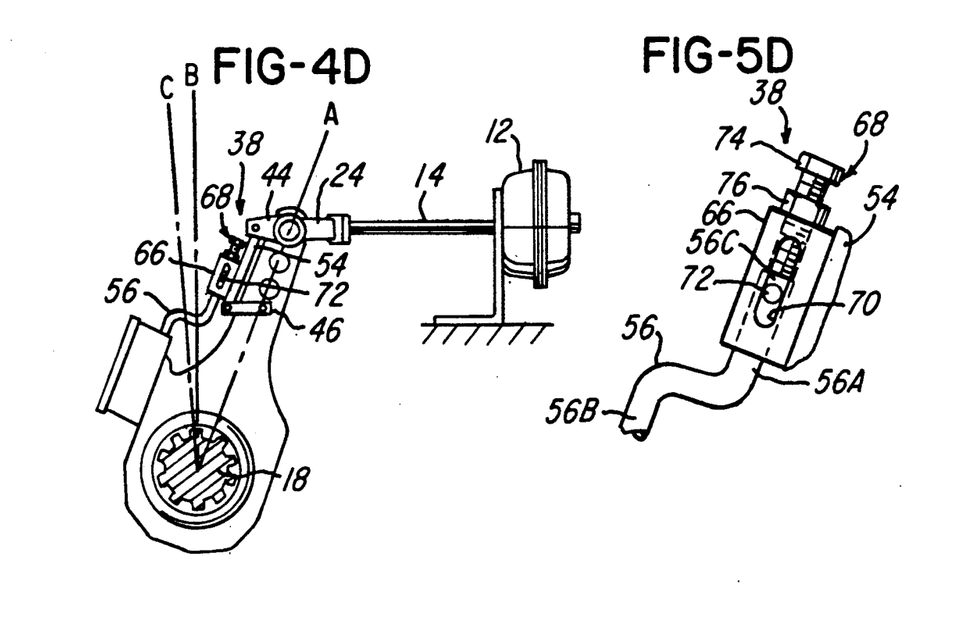
FIGS. 5A-5D are a sequence of views showing the relative positions of components of the slack adjuster of FIG. 2 at successive positions in the brake apply and release cycle corresponding to the positions seen in FIGS. 4A-4D.

As the brake shoe lining wears or heat expands the drum so as to increase the clearance beyond the acceptable range, slack adjuster pivotal arm 28 will move through the over-normal working stroke 0 to the position C shown in FIG. 4C. Lower elongated member 56 is now lifted sufficiently (more than pitch P of ratchet teeth 48) to permit indexing of teeth 58 of upper elongated member 56 past to teeth 48 of ratchet wheel 40 to where catching with the next teeth occurs, as shown in FIG. 5C. Since lower elongated member 56 has been lifted a distance equal to at least one pitch of ratchet wheel teeth 48, the bottom of the stop element or cap screw 74 pushes upper end 56C of lower elongated member 56 downward at the end of the return stroke of pivotal arm 28, as represented in FIGS. 4D and 5D, causing rotation of ratchet wheel 40 counterclockwise as viewed in FIG. 5C which, in turn, causes clearance adjusting rotation of worm shaft 30 and worm gear 32. Near the end of the return stroke, the load on cam shaft 18 is removed so that rotation of ratchet wheel 40 can be easily accomplished. (To reverse worm shaft 30, a thin plate is placed between ratchet wheel 40 and the rack of teeth 48 and pawl 51 to disengage the teeth 48 and pawl 51.)

Thus, the increment of adjustment is one pitch of ratchet wheel 40, for example, 1.5 mm pitch, 60 teeth or 6°. This increment of adjustment is further reduced as described above by multi-gear reduction unit 52 and by the reduction ratio between worm shaft 30 and worm gear 32. For example, the actual increment of adjustment of the brake shoes is much smaller still.

FIGS. 6-7 and 8-9 illustrate two modified embodiments of the slack adjuster of the present invention. Components in common with slack adjuster 34 of FIGS. 2 and 3 have the same reference numerals. In slack adjusters 82, 84 of FIGS. 6-7 and 8-9, the respective adjusting assembly 86, 88 each has a lower member 90 in the form of a hollow sleeve having the rack of ratchet teeth 58 thereon. Further, coupler 92 is now an elongated rod 94 extending through lower member 90 and having an enlarged bottom head 96 located below lower member 90 and a stop element 98 in the form of a locking nut threaded on rod 94 above lower member 90. The operation of adjusting assemblies 86, 88 in causing or not causing adjustment of the relative position of pivotal arm 28 to cam shaft 18 is substantially the same as described earlier. Also, different reduction arrangement is used in the embodiment of FIGS. 8 and 9 than in the other two embodiments.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. In an automatic slack adjuster having an elongated pivotal arm pivotally connected to a push rod of a vehicle air brake system for pivotal movement of said arm upon extension and retraction of the push rod, and a set of intermeshing gears mounted to said arm for connecting said arm to a cam shaft of the vehicle brake system for causing rotation of the cam shaft upon pivotal movement of said arm, said set of gears being operable for adjustably, pivotally moving said arm relative to the cam shaft upon rotation of said gears relative to one another to change the angular position of said arm relative to the cam shaft for changing the clearance between the braking elements of the brake system, an adjustment mechanism comprising:

(a) a motion transmitting member having a first set of drive elements thereon and being movably mounted to said arm and drivingly coupled to said set of gears for causing clearance adjusting rotation of said gears upon movement of said motion transmitting member;

(b) an adjusting assembly having a second set of drive elements thereon complementary to said first set of drive elements of said motion transmitting member; and (c) means for pivotally mounting said adjusting assembly to the push rod and said pivotal arm so as to define a pivotal parallelogram linkage disposing said adjusting assembly with said second set of drive elements in a one-way driving interengagement relation springably interconnected with said first set of drive elements of said motion transmitting member and permitting generally reciprocable movement of said adjusting assembly along said arm as said arm undergoes pivotal movement upon extension and retraction of the push rod for movably driving said motion transmitting member to cause said clearance adjusting rotation of said gears upon movement of said arm and thereby the push rod through an over-normal brake apply stroke.

2. The automatic slack adjuster as recited in claim 1, wherein said motion transmitting member is a wheel and said first set of drive elements is in the form of a set of ratchet teeth.

3. The automatic slack adjuster as recited in claim 1, wherein said adjusting assembly includes upper and lower elongated members.

4. The automatic slack adjuster as recited in claim 3, wherein said lower member of said adjusting assembly has said second set of drive elements thereon.

5. The automatic slack adjuster as recited in claim 4, further comprising:
a plurality of springs interconnecting said lower member and said arm for biasing said lower member toward said motion transmitting member while being yieldable for permitting lateral movement of said lower member away from said motion transmitting member.

6. The automatic slack adjuster as recited in claim 3, wherein said upper member of said adjusting assembly is part of said pivotal parallelogram linkage.

7. The automatic slack adjuster as recited in claim 3, wherein said adjusting assembly also includes a coupler interconnecting said upper and lower members for sliding movement relative to one another and defining a first limit to the movement of said upper and lower members away from one another.

8. The automatic slack adjuster as recited in claim 7, wherein said coupler is a sleeve having a pair of axially extending slots and receiving an end of said lower member therein, and a pin extending transversely through said lower member end and said slots for permitting sliding movement of said lower member relative to said coupler but limited to between opposite ends of said slots.

9. The automatic slack adjuster as recited in claim 7, wherein said adjusting assembly further includes a stop element adjustably mounted on said coupler for presetting a second opposite limit to the movement of said upper and lower members toward one another for defining a point separating a normal working stroke of said pivotal arm and thereby the push rod wherein pivoting of said arm and therewith motion of said adjusting assembly does not drive said motion transmitting member and said over-normal working stroke of said pivotal arm and thereby the push rod wherein pivoting of said arm and therewith motion of said adjusting assembly does drive said motion transmitting member for causing clearance adjusting rotation of said gears.

10. The automatic slack adjuster as recited in claim 9, wherein said coupler is a hollow sleeve attached to said upper member and receiving an end of said lower member, and said stop is a cap screw threadable into said sleeve.

11. The automatic slack adjuster as recited in claim 3, wherein said arm and said upper member of said adjusting assembly have aligned rows of spaced holes for defining different lengths of said arm and said pivotal parallelogram linkage to accommodate different working stroke lenghts of the push rod and displacements of the adjusting assembly.

12. The automatic slack adjsuter as recited in claim 3, wherein said lower member of said adjusting assembly is a hollow sleeve with a rack of ratchet teeth thereon.

13. The automatic slack adjuster as recited in claim 12, wherein said adjusting assembly also includes a coupler interconnecting said upper and lower members for sliding movement relative to one another, said coupler being in the form of an elongated rod extending through said lower member and having an enlarged bottom head located below said lower member and an adjustable stop element thereon above said lower member.

14. The automatic slack adjuster as recited in claim 1, wherein said means for pivotally mounting said adjusting assembly includes a pair of link elements each having opposite ends and extending substantially parallel to and spaced from one another along said arm, one of said link elements being fixed at one end to the push rod and pivotally connected at the opposite end to said adjusting assembly and the other of said link elements being pivotally connected at one end to said arm and pivotally connected at the opposite end to said adjusting assembly to define said pivotal parallelogram linkage therewith.

15. The automatic slack adjuster as recited in claim 1, further comprising:
a gear reduction unit mounted to said arm and drivingly coupling said motion transmitting member to said set of gears.

16. In an automatic slack adjuster having an elongated pivotal arm pivotally connected at an upper portion to a push rod of a vehicle are brake system for pivotal movement of said arm upon extension and retraction of the push rod, and a set of intermeshing gears mounted to a lower portion of said arm for connecting said arm to a cam shaft of the vehicle brake system for causing rotation of the cam shaft upon pivotal movement of said arm, said set of gears being operable for adjustably, pivotally moving said arm relative to the cam shaft upon rotation of said gears relative to one another to change the angular position of said arm relative to the cam shaft for changing the clearance between brake shoes and a brake drum of the brake system, an adjustment mechanism comprising;
(a) a motion transmitting member having a first set of ratchet teeth and being rotatably mounted onto a shaft pressed into said lower portion of said arm and drivingly coupled to said set of gears for causing adjusting rotation of said gears upon rotation of said motion transmitting member;
(b) an adjusting assembly including upper and lower elongated members, said lower member having a second set of ratchet teeth thereon complementary to said first set of ratchet teeth of said motion transmitting member;
(c) a pair of link elements each having opposite ends and extending substantially parallel to and spaced from one another along said one end portion of said arm, one of said link elements being fixed at one end of the push rod and pivotally connected at the opposite end to said upper member of said adjusting assembly and the other of said link elements being pivotally connected at one end to said arm and pivotally connected at the opposite end to said upper member of said adjusting assembly to define a pivotal parallelogram linkage disposing said lower member of said adjusting assembly with its second set of ratchet teeth in a one-way driving relation with said first set of ratchet teeth of said motion transmitting member and permitting generally rectilinear movement of said upper and lower members of said adjusting assembly along said arm as said arm undergoes pivotal movement upon extension and retraction of the push rod; and (d) said adjusting assembly also including a coupler interconnecting said upper and lower members for sliding movement relative to one another and defining a first limit to the movement of said upper and lower members away from one another and a stop element adjustably mounted on said coupler for presetting a second opposite limit to the movement of said upper and lower members toward one another for defining a point separating a normal working stroke of said pivotal arm and thereby the push rod wherein pivoting of said arm and therewith motion of said adjusting assembly does not rotatably drive said motion transmitting member and an over-normal working stroke of said pivotal arm and thereby the push rod wherein pivoting of said arm and therewith motion of said adjusting assembly does rotatably drive said motion transmitting member for causing clearance adjusting rotation of said gears.

17. The automatic slack adjuster as recited in claim 16, further comprising:
a plurality of springs interconnecting said lower member and said arm for biasing said lower member toward said motion transmitting member while being yieldable for permitting lateral movement of said lower member away from said motion transmitting member.

18. The automatic slack adjuster as recited in claim 16, wherein said coupler is a sleeve having a pair of axially extending slots and receiving an end of said lower member therein, and a pin extending transversely through said lower member end and said slots for permitting sliding movement of said lower member relative to said coupler but limited to between opposite ends of said slots.

19. The automatic slack adjuster as recited in claim 16, wherein said coupler is a hollow sleeve attached to said upper member and receiving an end of said lower member, and said stop is a cap screw threadable into said sleeve.

20. The automatic slack adjuster as recited in claim 16, wherein said arm and said upper member of said adjusting assembly have aligned rows of spaced holes for defining different lengths of said arm and said pivotal parallelogram linkage to accommodate different working stroke lengths of the push rod and displacements of said adjusting assembly.

21. The automatic slack adjuster as recited in claim 16, further comprising:
a gear reduction unit mounted to said arm and drivingly coupling said motion transmitting member to said set of gears.

22. The automatic slack adjuster as recited in claim 16, wherein said lower member of said adjusting assembly is a hollow sleeve having a rack of said ratchet teeth thereon.

23. The automatic slack adjuster as recited in claim 22, wherein said adjusting assembly also includes a coupler interconnecting said upper and lower members for sliding movement relative to one another, said coupler being in the form of an elongated rod extending through said lower member and having an enlarged bottom head located below said lower member and an adjustable stop element thereon above said lower member.

* * * * *